United States Patent [19]
Nicholls

[11] 3,880,412
[45] Apr. 29, 1975

[54] SUSPENSION UNITS

[75] Inventor: Lawrence George Nicholls, Tyseley, England

[73] Assignee: Girling Limited, Birmingham, England

[22] Filed: Jan. 28, 1974

[21] Appl. No.: 437,203

[30] Foreign Application Priority Data
Jan. 29, 1973  United Kingdom................ 4476/73

[52] U.S. Cl. ............................................. 267/67
[51] Int. Cl. ........................................... B60g 13/00
[58] Field of Search ............................... 267/67, 66

[56] References Cited
UNITED STATES PATENTS
2,160,271  5/1939  Kliesrath .............................. 267/67
3,087,742  4/1963  Muller et al. ......................... 267/66
3,811,664  5/1974  Spinks .................................. 267/66

Primary Examiner—James B. Marbert
Attorney, Agent, or Firm—Scrivener, Parker, Scrivener and Clarke

[57] ABSTRACT

A vehicle suspension unit comprises a strut which fits within a cup-shaped portion of a stub axle and has a projection which extends through an aperture in the bottom of the stub axle. The stub axle and strut are secured against relative axial movement by a nut secured to the projection and are clamped against relative rotational movement by a pinch bolt acting across a longitudinally extending slit in the stub axle. The projection and the aperture are preferably of non-circular cross-section to positively locate the strut in a predetermined angular position.

3 Claims, 2 Drawing Figures

SUSPENSION UNITS

This invention relates to vehicle suspension units comprising a suspension strut attached at its lower end to a stub axle which is adapted to carry road wheels of a vehicle. The strut may have the same general form and construction as the well-known McPherson strut.

Such units are known in which the lower end of the strut is adapted to be releasably secured to the stub axle and is formed with a keyed tapered portion for fitting into a recess of complementary form in the stub axle to prevent relative rotation between the stub axle and the strut.

These known units have the disadvantage that they require specially made, and correspondingly expensive struts and stub axles.

In accordance with the present invention there is provided a vehicle suspension unit comprising a stub axle, a strut having an end portion fitting within the stub axle, retaining means for preventing relative axial movement between the stub axle and the strut, and separate clamping means clamping the strut and the stub axle together against relative rotation. Preferably, a longitudinally extending slit is formed in the stub axle and a pinch bolt acts across the slit to constitute the clamping means.

In a preferred form of unit described in more detail below, the retaining means comprises an axially extending projection, for example a screw-threaded stud, provided, conveniently by welding, on the end portion of the strut and passing through a complementarily shaped aperture in the stub axle, and a manually removable retaining member, for example a nut, secured to the projection to prevent withdrawal of the projection through the aperture. The nut may be self-locking, or secured against vibration by a locking washer or a tab washer.

When a specific relative angular positioning of the stub axle and strut is required, the stud is preferably of non-circular cross-section to register in a unique angular position with a correspondingly shaped hole through the stub axle. The clamping means acts to lock the stub axle against rotation relative to the strut and thus to relieve the stud of torque, and also to prevent bending loads being transmitted to the stud by relative lateral movement and/or angulation between the strut and the stub axle. This latter function could be achieved by accurately machining the parts so that the lower end of the strut is a close fit in the stub axle, but this is an expensive solution, and we prefer to rely on a circumferential clamping action, for example by means of a pinch bolt acting across an axial slit in the stub axle. The slit is preferably positioned in a plane containing the axis of the stub axle, this being the plane along which the greatest loads are normally encountered in practice, due typically to the wheel sliding sideways on to the roadside kerb. The pinch bolt is thus substantially relieved of these particular loads so that the risk of the slit being forced open is minimised.

With this preferred form of unit, conventional struts and stub axles which are normally welded together can be simply and cheaply modified so that the strut is removable and replaceable without having to replace the whole unit. A conventional strut is simply modified by fixing the projection to the strut, for example by welding.

This form of suspension unit in accordance with the invention will now be described, by way of example with reference to the accompanying drawings in which.

Figure 1:
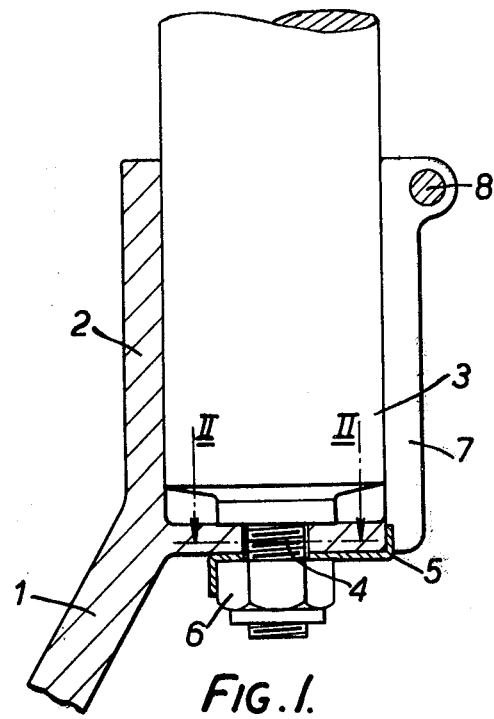
FIG. 1 is a fragmentary view, partly in section, of the unit.
Figure 2:
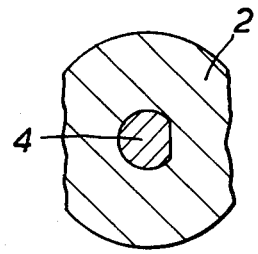
FIG. 2 is a section taken along the line II—II of FIG. 1 of a modification.

Referring to FIG. 1 a stub axle 1 has a cup-shaped portion 2 within which is received the lower end of a suspension strut or shock absorber 3. Attached to lower end of the strut 3 is a projection in the form of a screw-threaded stud 4 which extends through an aperture in the bottom of the cup-shaped portion 2 of the stub axle. The strut is retained in position and locked against axial movement relative to the stub axle by a locking washer 5 and a retaining member in the form of a nut 6 secured to the stud 4. If it is desired to achieve a particular orientation of the strut within the stub axle, the stud may be of non-circular cross-section and located in a complementary shaped hole in the bottom of the cup-shaped portion 2 of the stub axle. The stud may, for example, be provided with a flat as shown in FIG. 2. Such particular positioning may be required for example to set the position of a spring carrier mounted on the strut.

The cup portion 2 of the stub axle is provided with a longitudinal slit 7 and a pinch bolt 8 acts across the slit so that when the pinch bolt is tightened the edges of the slit are drawn together and the stub axle is firmly clamped to the strut 3 to prevent the strut rotating relative to the stub axle.

The stud 4 may be welded or otherwise fastened to a conventional strut to provide the illustrated strut 3.

I claim:

1. A vehicle suspension unit comprising a stub axle, a strut having an end portion fitting within said stub axle, retaining means for preventing relative axial movement between said stub axle and said strut, and separate clamping means for clamping said strut and said stub axle together against relative rotation said clamping means comprising means defining a slit extending longitudinally of said stub axle and a pinch bolt acting across said slit.

2. A vehicle suspension unit according to claim 1, wherein said stub axle defines an aperture therein, and wherein said retaining means comprises a projection extending axially from said end portion of said strut and through said aperture which is of complementary shape, and a manually removable retaining member secured to said projection to prevent withdrawal of said projection through said aperture.

3. A vehicle suspension unit according to claim 2, wherein said projection is of non-circular cross section and said aperture is complementarily shaped to receive said projection.

* * * * *